United States Patent [19]

Persson

[11] Patent Number: 4,699,519

[45] Date of Patent: Oct. 13, 1987

[54] GRAIN TEMPERATURE MONITOR

[75] Inventor: Gleelynn W. Persson, Trimont, Minn.

[73] Assignee: Performance Technology, Inc., Trimont, Minn.

[21] Appl. No.: 878,522

[22] Filed: Jun. 24, 1986

Related U.S. Application Data

[63] Continuation of Ser. No. 721,046, Apr. 8, 1985, abandoned.

[51] Int. Cl.⁴ .............................................. G01K 1/02
[52] U.S. Cl. ...................................... 374/111; 374/166; 374/188; 340/519; 340/584
[58] Field of Search ............... 374/110, 111, 163, 166, 374/167, 172, 173, 178, 179, 188, 189; 340/584, 595–599, 519; 307/354, 356, 358, 310; 73/295

[56] References Cited

U.S. PATENT DOCUMENTS

| | | | |
|---|---|---|---|
| 3,922,640 | 11/1975 | Ruof | 374/111 |
| 3,927,571 | 12/1975 | Athey | 374/111 |
| 4,102,194 | 7/1978 | Eng | 340/598 |
| 4,307,606 | 12/1981 | Johnson | 374/189 |
| 4,324,138 | 4/1982 | Davis et al. | 374/111 |
| 4,340,886 | 7/1982 | Boldt et al. | 340/595 |
| 4,440,509 | 4/1984 | Agarwal | 374/166 |
| 4,470,711 | 9/1984 | Brzozowski | 374/163 |

Primary Examiner—Charles Frankfort
Assistant Examiner—Patrick R. Scanlon
Attorney, Agent, or Firm—Henderson & Sturm

[57] ABSTRACT

A grain temperature monitor for use with one or more grain bins, the monitor including one or more temperature sensors, an analog sensor indicator unit, and a non-analog sensor indicator unit. The analog sensor indicator unit provides a signal when one or more of the temperature sensors senses a temperature in the monitored grain that equals or exceeds a predetermined reference temperature. In addition, an operator controllable switch can be manipulated to determine the approximate temperature of the highest sensed temperature. The non-analog sensor indicator unit provides a visual indication as to which of the temperature sensors then currently senses the highest temperature, without regard as to whether such sensed temperature exceeds the predetermined temperature threshold or not.

8 Claims, 7 Drawing Figures

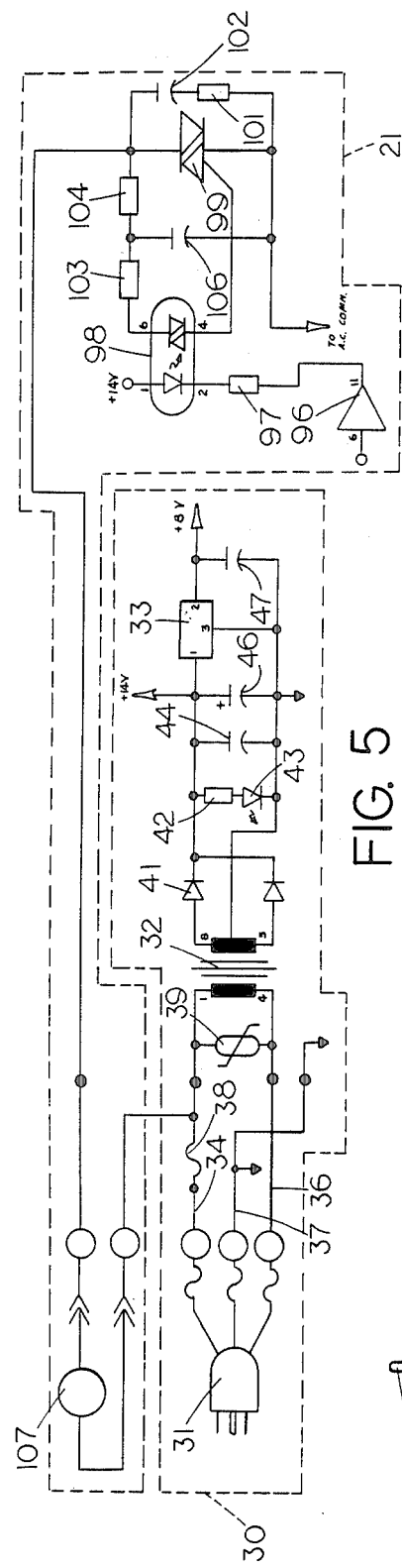
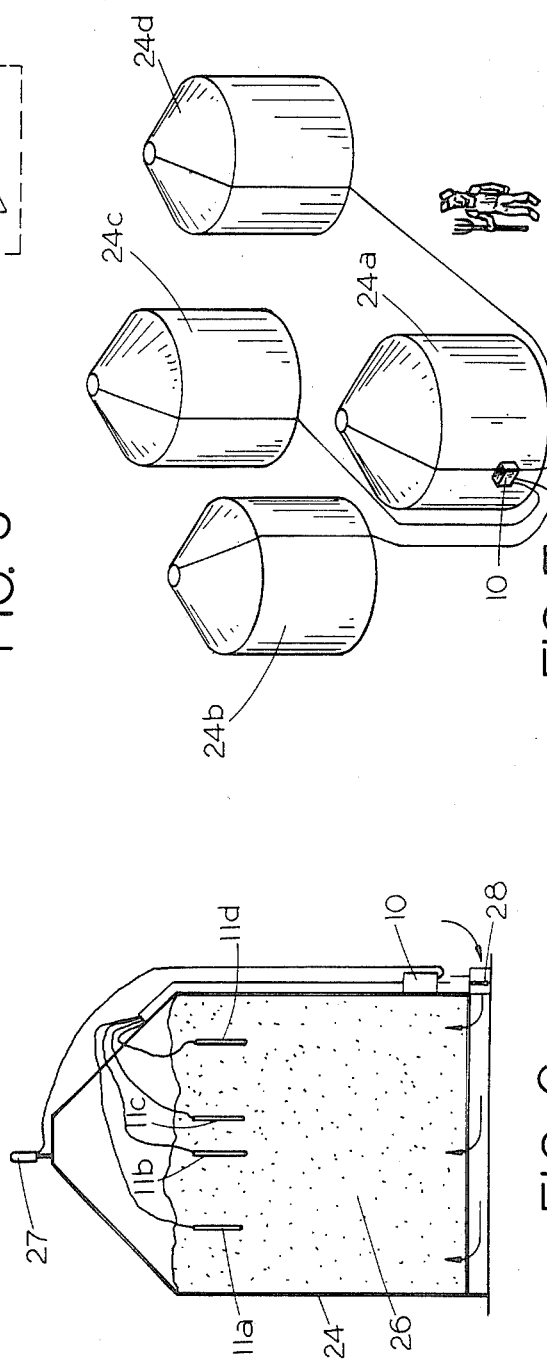
FIG. 5
FIG. 7
FIG. 6

GRAIN TEMPERATURE MONITOR

This is a continuation of co-pending application Ser. No. 06/721,046 filed on Apr. 8, 1985 and now abandoned.

TECHNICAL FIELD

This invention relates generally to grain storage, and more particularly to the sensing grain temperature.

BACKGROUND ART

Typically, newly harvested grain will not be immediately consumed or processed. Rather, harvested grain will typically be stored for some period of time in large storage vessels such as grain bins. Often, during this storage period, the grain will be cured to reduce its moisture content and thereby render it more suitable for long term storage.

Grain storage poses one particularly well known problem; controlling the temperature of the grain. Grain bins typically include one or more fans to force air through the stored grain and also often include heat lamps or other heat sources so that heat can be forced through the grain. In order to make appropriate use of these devices, however, the operator must have information regarding grain temperature. This problem raises substantial problems in part because the temperature of the grain in one area may be substantially different than the temperature of the grain at another area in the grain mass.

Knowing grain temperature is important because too high a temperature can lead to undesired metabolic activity on the part of the grain itself, or the creation and support of mildew and other spoilage contributing factors. On the other hand, too low a temperature can impede the curing process.

A number of problems are associated with monitoring grain temperature in such a setting. As noted above, grain temperature can vary from place to place within the grain mass itself. Furthermore, obtainment, installation and later operation of a temperature monitoring system must be cost effective. Also, grain bins represent a harsh environment for operating delicate instruments, and this factor represents a significant obstacle to the design and manufacture of an appropriate grain temperature monitor. Finally, such a monitor should be relatively easy to use.

Furthermore, a different problem exists in that different operators have different temperature monitor requirements. For instance, some operators may only need to monitor temperature in a single area in a number of grain bins. In opposition to this, other operators may wish to measure grain temperature at a number of places within a single grain bin. Similarly, whereas some operators may need only a visible signal regarding temperature conditions, other operators may wish an audible sound to alert them of preselected conditions. Finally, some operators may not be concerned with providing an alarm as such, but prefer instead that fans, heaters or other grain conditioning equipment activate or deactivate automatically depending upon the temperature of the grain.

To date, no one device as set forth in the prior art meets all of these needs.

DISCLOSURE OF INVENTION

These needs are, however, substantially met by provision of the invention disclosed in this specification.

This invention includes generally one or more temperature sensors that can be selectively positioned within a grain mass as desired by the operator. These temperature sensors connect to both a non-analog sensor indicator unit and an analog sensor indicator unit.

The non-analog sensor indicator unit provides a visual indication regarding which of the sensors is then currently sensing the warmest temperature. The analog sensor indicator unit provides a visual signal when the warmest sensed temperature exceeds a predetermined limit, and further can be utilized by the operator to measure the warmest sensed temperature.

In an enhanced embodiment of this invention, an auxiliary output unit can be utilized to allow fans, heat lamps or other devices to be automatically activated and deactivated in response to signals issue by the analog sensor indicator unit.

A device constructed in accordance with the teachings of this disclosure can be manufactured in a relatively economical manner. Nevertheless, the device operates and survives well in the harsh environment of a grain bin, and further has the flexibility to accomodate the divergent anticipated needs of various operators. Furthermore, the device consumes little power and contributes little to the operating overhead of a grain storage facility.

BRIEF DESCRIPTION OF THE DRAWINGS

Referring now to the drawings, these and other attributes of the invention will become more clear upon making a thorough study and review of the following description of the best mode for carrying out the invention, particularly when reviewed in conjunction with the drawings, wherein:

FIG. 5 comprises a schematic diagram of a power supply suitable for use with the invention;

FIG. 6 comprises a side elevational diagrammatic view of the invention as configured for use with a single grain bin; and FIG. 7 comprises a perspective diagrammatic view of the device as configured for use with a plurality of grain bins.

BEST MODE FOR CARRYING OUT THE INVENTION

Figure 1:
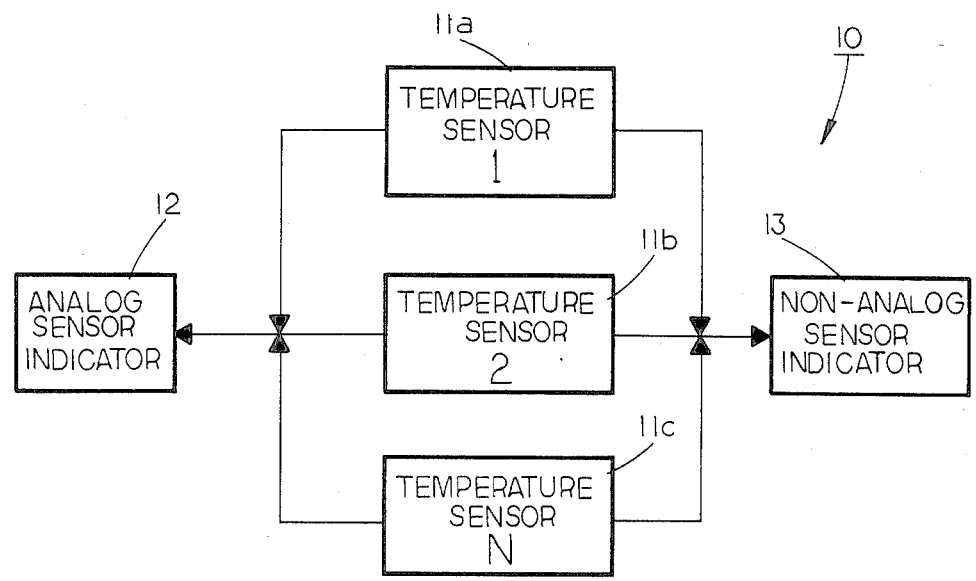
FIG. 1 represents a generalized block diagram view of the invention.

Referring to FIG. 1, the invention can be seen as depicted generally by the numeral 10. The device (10) includes a plurality of temperature sensors (11a–11c), an analog sensor indicator unit (12) and a non-analog sensor indicator unit (13). Each of these generally referred to components will now be described in more detail in seriatim fashion.

Figure 3:
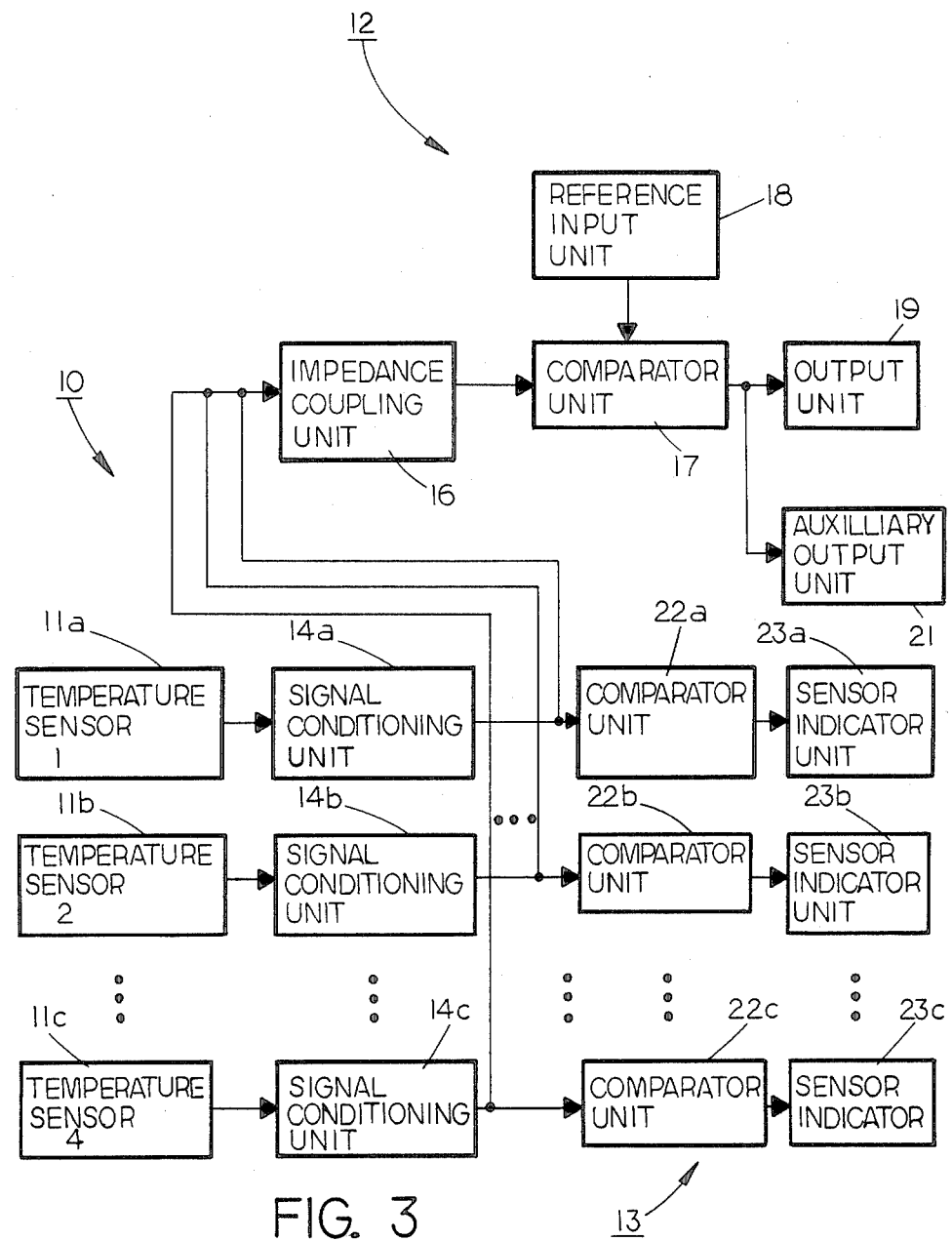
FIG. 3 comprises a block diagram view of a second embodiment of the invention.

Referring now to FIG. 3, a more detailed block diagram depiction of the device (10) can be seen. Each of the temperature sensors (11a–11c) connects to a signal conditioning unit (14a–14c). In turn, the output from each of these signal conditioning units (14a–14c) connects to both the analog sensor indicator unit (12) and the non-analog sensor indicator unit (13).

The analog sensor indicator unit (12) includes an impedance coupling unit (16) that receives the input from each of the signal conditioning units (14a–14c). The output of the impedance coupling unit (16) connects to the input of a comparator unit (17), the remaining input of which connects to a reference input unit (18). The output of the comparator unit connects to an output unit (19) and also to an auxiliary output unit (21).

In operation, the analog sensor indicator unit (12) compares the largest output from the signal conditioning units (14a–14c) against a reference input that can be selectively varied by the operator through manipulation of the reference input unit (18). At such times as the input to the comparator unit from the temperature sensors equals or exceeds the reference input from the reference input unit (18), a drive signal will be provided to the output unit (19) to flash a signal light or the like. The auxiliary output unit (21), when enabled by the analog sensor indicator unit (12), can provide power to aerating fans, heat lamps or other devices as the operator may choose.

With continued reference to FIG. 3, the non-analog sensor indicator unit (13) includes a comparator unit (22a–22c) and a sensor indicator unit (23a–23c) as connected to each of the signal conditioning units (14a–14c). These latter components operate such that only the sensor indicator unit (23a–23c) as associated with the temperature sensor (11a–11c) that senses the warmest temperature will be activated.

In operation, the temperature sensors (11a–11c) can be disposed within the grain mass of a single grain bin (24) as desired (as depicted in FIG. 6). The device (10) may be affixed in a convenient location, such as on an exterior wall of the grain bin (24) itself. At all times, a sensor indicator unit (23a–23c) as associated with the temperature sensor (11a–11c) sensing the warmest temperature in the grain mass (26) will be activated. Therefore, an operator can always determine the warmest sensed area in the grain mass (26) by referring to the sensor indicator units (23a–23c).

At such time as the temperature sensed by any one of the temperature sensors (11a–11c) exceeds the reference input, the analog sensor indicator unit (12) will provide a signal light via the output unit (19). In addition, the auxiliary output unit (21) can be utilized to drive a supplemental signal light (27), aeration fans (28), or other alarm or control devices as the operator may desire.

Similarly, with reference to FIG. 7, the device (10) can be utilized to monitor more than one grain bin by disposing one or more temperature sensors in the grain bins (24a–24d) that the operator wishes to monitor. As with the description set forth above with respect to FIG. 6, the auxiliary output unit can be utilized to control aeration fans in one or more of the grain bins (24a–24d), signal lights, audible alarms or other output devices as the operator may desire.

Figure 2:
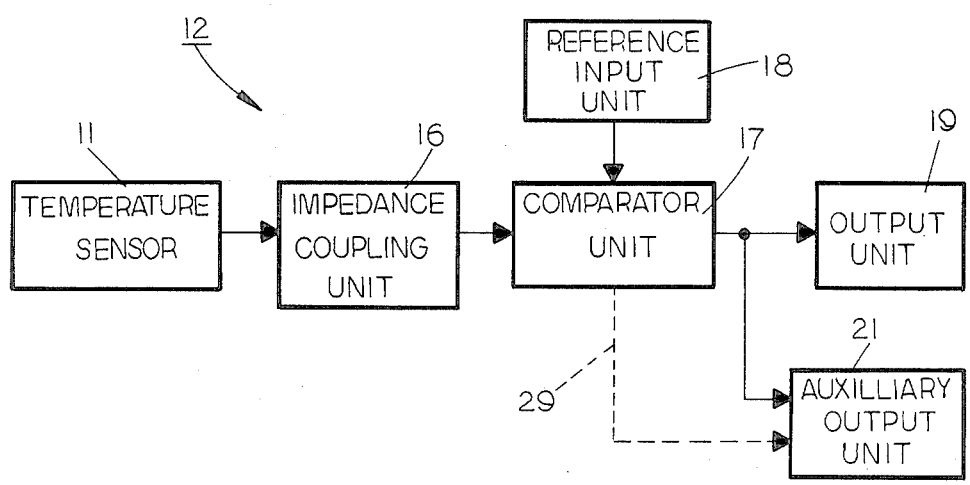
FIG. 2 comprises a block diagram view of a first embodiment of the invention.

With reference to FIG. 2, a simplified embodiment of this invention can also be provided as may befit a particular application. A single temperature sensor (11) may be connected to an analog sensor indicator unit (12) as essentially described above with respect to FIG. 3. More particularly, this analog sensor indicator unit (12) includes an impedance coupling unit (16), a comparator unit (17), a reference input unit (18), an output unit (19), and an auxiliary output unit (21). The operation of these components has been set forth above with respect to FIG. 3, and hence will not be repeated here.

FIG. 2 also illustrates, however, that the auxiliary output unit can be separately controlled by the comparator unit (17) through a different output circuit (29) as depicted by the phantom line. As will be described in more detail below, this alternative connection may be appropriate depending upon the desired functions of the output unit (19) itself.

Referring now to FIG. 5, a power supply suitable for use with this device (10) will be described. The power supply can be seen as depicted generally by the numeral 30 and includes generally a power plug (31), a transformer (32), and a voltage regulator (33).

The power plug (31) has an AC high line (34), an AC common line (36), and a ground line (37). A fuse (38) connects in series between the AC high line (34) and a primary winding terminal of the transformer (32). The AC common line (36) connects to the remaining primary winding terminal of the transformer (32). In addition, a thermistor (39) connects across the primary winding of the transformer (32).

One terminal of the secondary winding of the transformer (32) connects through a 1N4002 diode (41) to an input port of an 8 volt voltage regulator (33) as provided through use of an MC78L08ACP. A second secondary winding terminal of the transformer (32) connects through another diode (40) to this same input. A center tap to the secondary winding of the transformer (32) connects to ground.

A series combined 60 ohm resistor (42) and light emitting diode (43) connect between the input of the voltage regulator (33) and ground. The light emitting diode (43) provides an indication of the presence of power in the power supply unit (30).

Finally, a 0.1 microfarad capacitor (44) and a 470 microfarad capacitor (46) connect in parallel between the input port to the voltage regulator (33) and ground, and a 0.1 microfarad capacitor (47) connect between the output port of the voltage regulator (33) and ground.

For purposes of powering the circuit described below, a positive 14 volt source can be obtained at the input port of the voltage regulator (33), a positive 8 volt regulated source can be obtained at the output thereof, and all ground connections can be made to the ground port of the voltage regulator (33).

Figure 4:
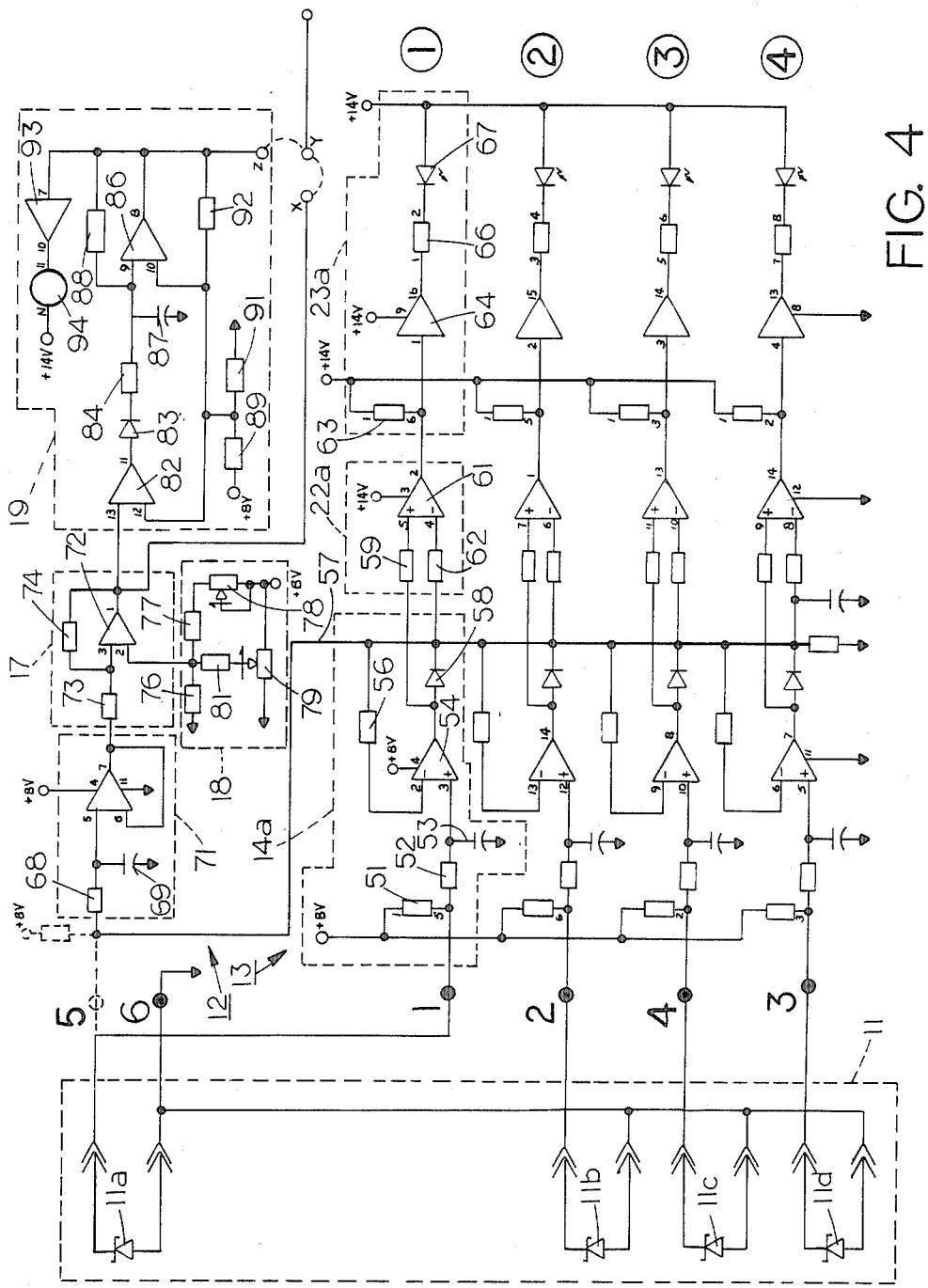
FIG. 4 comprises a schematic diagram of the invention.

Referring now to FIG. 4, a detailed description of the components utilized to realize a working embodiment of the device (10) as described above will be set forth. One terminal of each temperature sensor (11a–11d) connects to ground, and the remaining terminal of each connects to a signal conditioning unit (14a–14d) as described in more detail below.

Since the individual signal conditioning units (14), comparator units (22) and sensor indicator units (23) as associated with each temperature sensor (11a–11d) are identical to one another, only one signal conditioning unit, comparator unit and sensor indicator unit will be described in detail, except where particular differences are specifically called forth.

The signal conditioning unit (14a) has an input for receiving signals from the temperature sensor (11a) that connects through a 5.6K ohm resistor (51) to the positive 8 volt source, and also through a differentiating circuit comprised of a 10K ohm resistor (52) and 0.1 microfarad capacitor (53) to the non-inverting input of an operational amplifier (54) (as provided through use of an LM2902N). The inverting input of this operational amplifier (54) connects through a 5.6K ohm feedback resistor (56) to an output buss (57). The output of the operational amplifier (54) connects through a diode (58) (as provided through use of a 1N4002) to the output buss (57). This output buss (57) connects similarly to each of the other signal conditioning units (14) and also to the analog sensor indicator unit (12) as described in more detail below.

In addition, the output of the operational amplifier (54) connects through a 10K ohm resistor (59) to the non-inverting input of a LM2901 comparator (61) as provided in the comparator unit (22a). The inverting input of this comparator (61) connects through a 10K ohm resistor (62) to the output buss (57). The remaining comparator units (22) are similarly connected to the outputs of the remaining signal conditioning units (14) and the output buss (57).

The output of the comparator (61) connects to the sensor indicator unit (23a). More particularly, the comparator output connects through a 5.6K ohm pull up resistor (63) to the positive 14 volt source and also to the input of an MC1416 driver (64). The output of this driver (64) connects through a 560 ohm current limiting resistor (66) to a light emitting diode (67), the anode of which connects to the positive 14 volt source.

So configured, it will be appreciated that only the light emitting diode (67) as associated with that temperature sensor (11) that senses the warmest temperature will be energized at any particular moment in time. Furthermore, this energization occurs independently of any operator established reference value. Hence, there will always be one sensor indicator unit light emitting diode (67) energized during operation of the device (10).

With continued reference to FIG. 4, the analog sensor indicator unit (12) includes an impedance coupling unit (16) for receiving inputs via the output buss (57) decribed above. This impedance coupling unit (16) includes a differentiator circuit having a 5.6K ohm resistor (68) and a 0.1 microfarad capacitor (69) that connects to the non-inverting input of an LM2902N operational amplifier (71). The inverting input of this operational amplifier connects directly to the output thereof, thereby forming a unit gain follower. The output of this operational amplifier (71) connects to a comparator unit (17). The comparator unit (17) includes a LM2901 comparator (72), the non-inverting input of which connects through a 5.6K ohm resistor (73) to the output of the impedence coupling unit (16), and also through a 1 mega ohm feedback resistor (74) to the output thereof. The inverting input of the operational amplifier (72) connects to the reference input unit (18).

The reference input unit (18) includes: (a) a 5.6K ohm resistor (76) that connects between ground and the inverting input of the operational amplifier (72); (b) and 8.66K ohm resistor (77) coupled in series with a 1K ohm variable resistor (78), the remaining terminal of which connects to the positive 8 volt source; and (c) a 5K ohm variable resistor (79) connected between the positive 8 volt source and ground, with a 120K ohm resistor (81) connecting its variable leg to the inverting input of the operational amplifier (72).

So configured, the 1K ohm variable resistor (78) can be adjusted during manufacture to assure appropriate calibration, and the 5K ohm resistor (79) can be mounted to allow an operator to vary it and thereby set differing temperature sensing levels.

The output of the comparator unit (17) connects to the output unit (19). The output unit includes a first operational amplifier (82) having an inverting input connected to the output of the comparator unit (17), and an output coupled through a series connected diode (83) and 5.6K ohm resistor (84) to the inverting input of a second operational amplifier (86). In addition, a 0.22 microfarad capacitor (87) connects to the inverting input of the second operational amplifier (86), and a 1 mega ohm feedback resistor (88) connects between the inverting input and the output thereof.

The non-inverting inputs of both operational amplifiers (82 and 86) connect to a voltage divider comprised of a 56K ohm resistor (89) and a second 56K ohm resistor (91) biased between the positive 8 volt source and ground. In addition, both non-inverting inputs connect through a 56K ohm feedback resistor (92) to the output of the second operational amplifier (86) the output of which also connects through a MC1416 driver (93) to a lamp (94), the opposing side of which is connected to the positive 14 volt source.

The circuitry just described for the output unit (19) provides a flashing drive signal to the light (94). If such an intermittent drive signal is desired as well with respect to the auxiliary output unit (21), then the nodes denoted by the reference characters Z and Y may be connected to one another. Otherwise, if a continuous drive output for the auxiliary output unit (21) is desired, then a connection between the nodes denoted by the reference characters X and Y should be provided.

The auxiliary output unit (21) includes an MC1416 driver (96), the output of which connects through a 560 ohm current limiting resistor (97) to an infra-red optocoupler (98) as provided through use of an MOC3010.

The triac of the optocoupler connects to the gate of a second triac (99). A series connected 39 ohm resistor (101) and a 0.01 microfarad capacitor (102) connect across the second triac (99). In addition, a 330 ohm resistor (103) and a 470 ohm resistor (104) connect between the optocoupler (98) and the triac (99), and a 0.047 microfarad capacitor (106) connects between the two above mentioned resistors (103 and 104) and ground. The second triac (99) essentially connects between ground and an external load output port (107) that may be utilized to supply power to aeration fans, supplemental signal lights, audible alarms or other output devices as may be selected by the operator.

Obviously, numerous modifications and variations of the present invention are possible in light of the above teachings. It is therefore to be understood that within the scope of the appended claims, the invention may be practised otherwise than as specifically described.

I claim:

1. A grain temperature monitor comprising:
   (a) a plurality of temperature sensors, each of said temperature sensors providing an analog sensor output signal that is proportional to temperature as sensed by said temperature sensor;
   (b) signal conditioning means for receiving said analog sensor output signals and for providing as outputs:
      (i) a primary output signal representing whichever analog sensor output signal corresponds to the temperature sensor currently sensing a highest temperature; and
      (ii) a plurality of secondary output signals wherein each of said secondary output signals represents a separate analog sensor output signal;

(c) first comparator means for receiving said primary output signal, for comparing said primary output signal against a reference signal, and for providing an over temperature output signal whenever said primary output signal at least exceeds said reference signal;

(d) first output means for receiving said over temperature output signal and for responding thereto by providing a predetermined response; and (e) second comparator means for receiving said primary output signal and said plurality of secondary output signals, for simultaneously comparing each of said secondary output signals against said primary output signal, and for continuously providing an indicator output signal indicating which of said secondary output signals at least equals said primary output signal, thereby continuously indicating which of said temperature sensors then senses said highest temperature.

2. The grain temperature monitor of claim 1 wherein said second comparator means comprises a plurality of comparators, with each of said comparators having one input connected to receive said primary output signal, another input connected to receive a unique one of said secondary output signals, and an output for providing said indicator output signal.

3. The grain temperature monitor of claim 2 and further including second output means for receiving said indicator output signal and for providing a visually preceptible response thereto.

4. The grain temperature monitor of claim 3 wherein said second output means comprises a plurality of driver units, wherein each of said driver units connects to respond to a unique one of said comparators.

5. The grain temperature monitor of claim 4 wherein said driver units each connect to a unique LED to thereby provide said visually perceptible response.

6. The grain temperature monitor of claim 1 wherein said first comparator means includes a comparator having a first input for receiving said primary output signal, a second input for receiving said reference signal, and an output for providing said over temperature output signal.

7. The grain temperature monitor of claim 6 wherein said first comparator means further includes means for matching impedance between the first nput of said comparator and said signal conditioning means.

8. The grain temperature monitor of claim 6 wherein said first comparator means further includes reference means for providing said reference signal, wherein said reference means includes control means for allowing said reference signal to be selectively varied.

* * * * *